United States Patent Office 2,840,958
Patented July 1, 1958

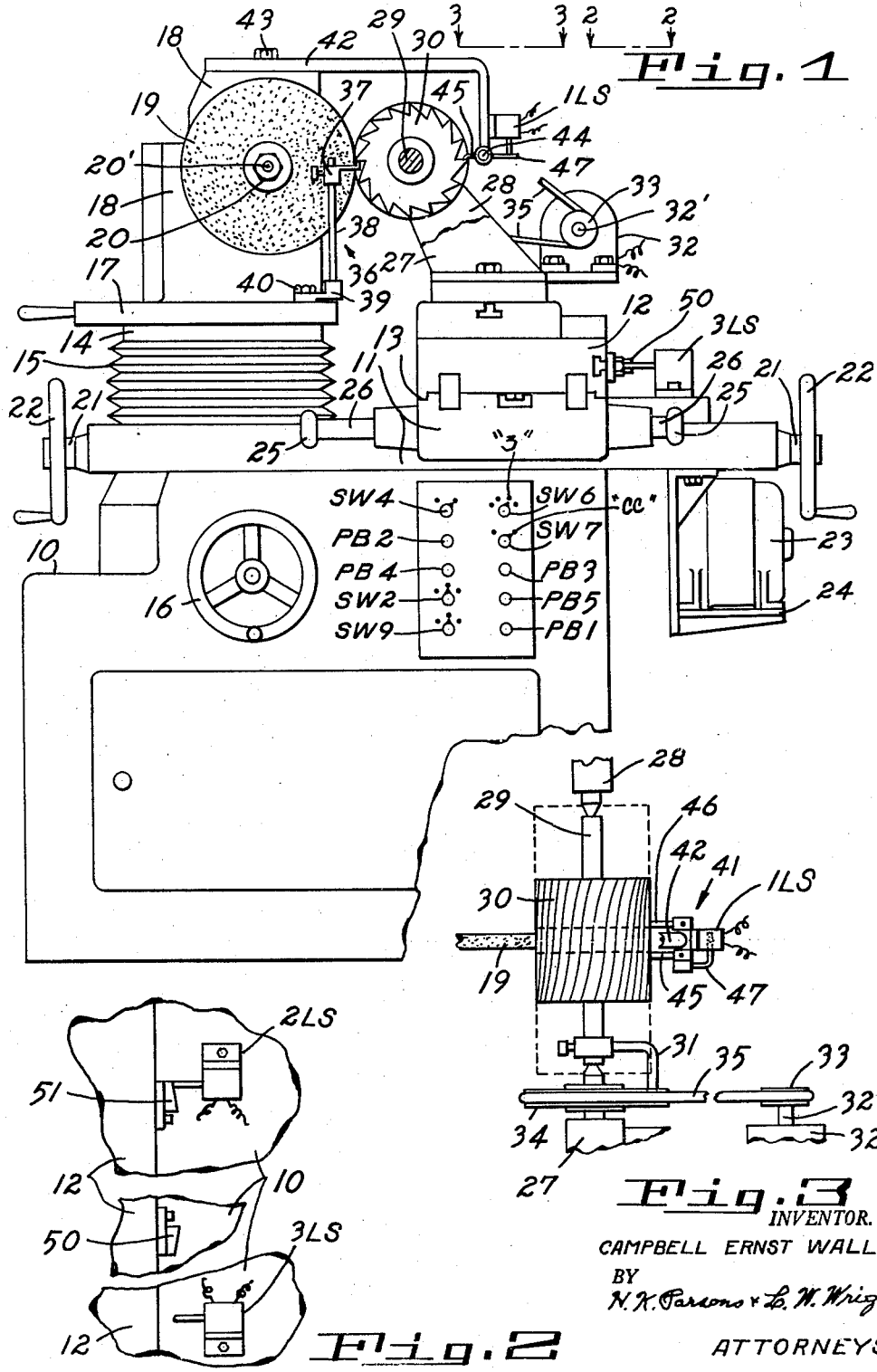

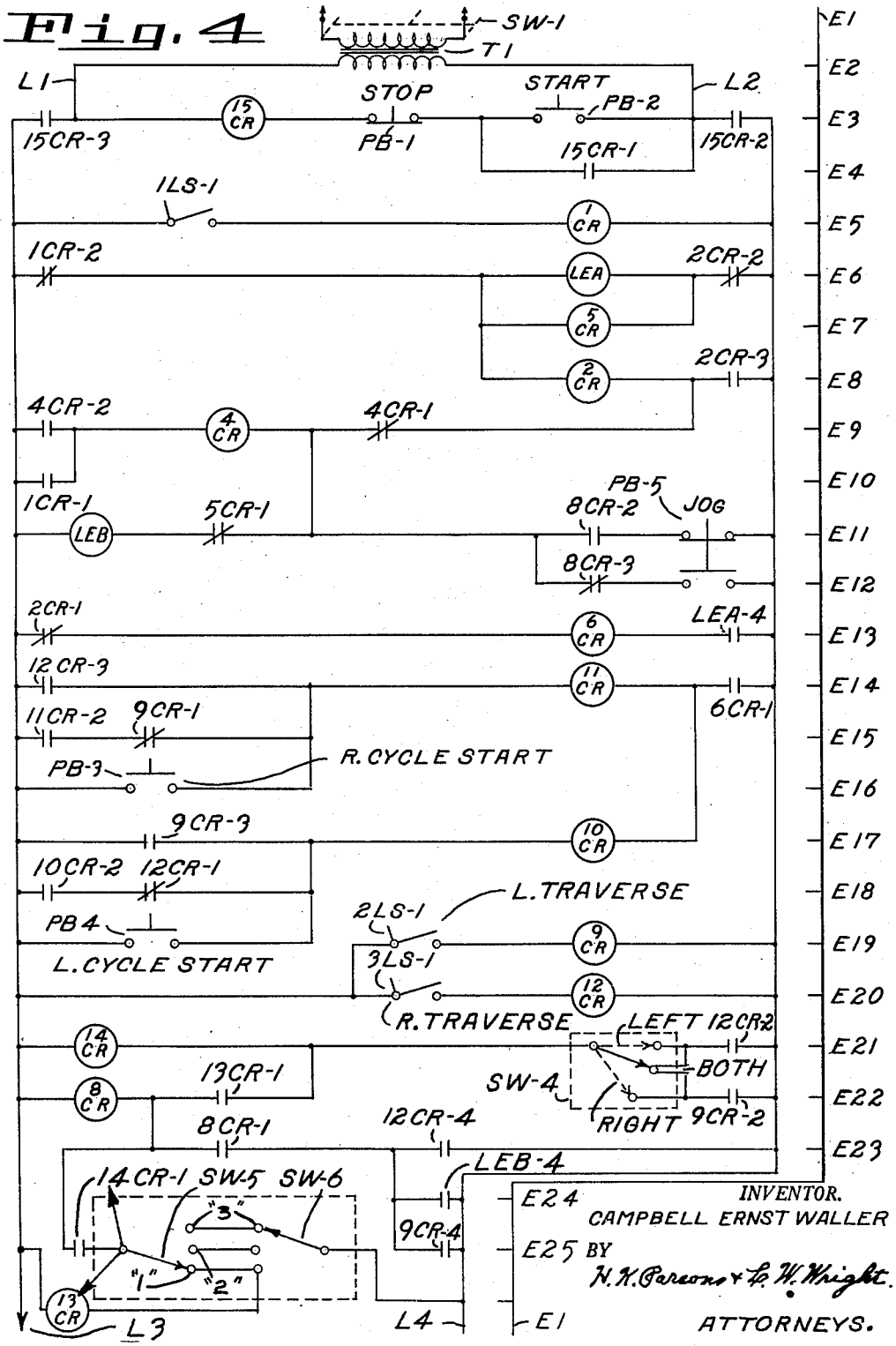

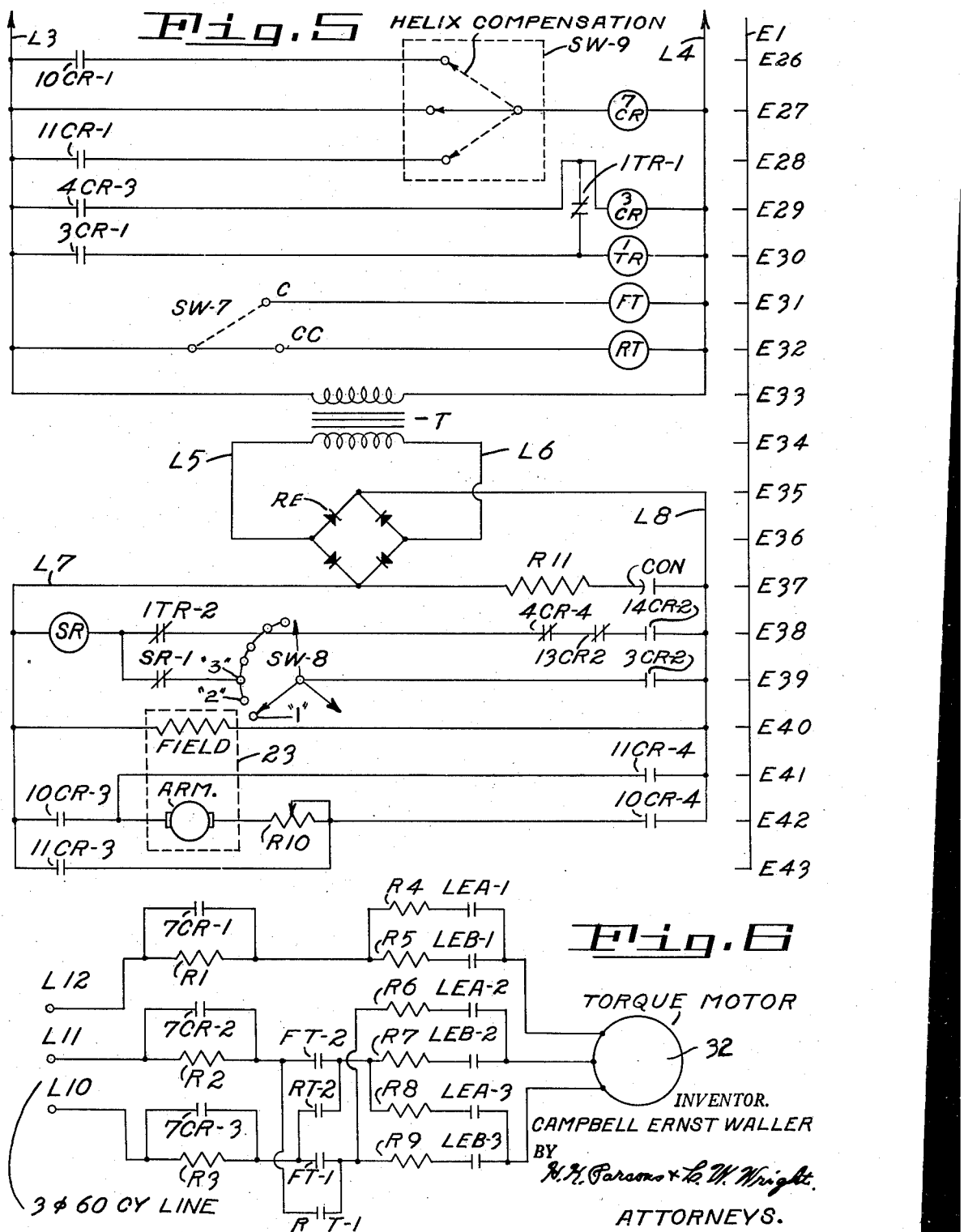

2,840,958

AUTOMATIC CUTTER GRINDER

Campbell Ernst Waller, Cincinnati, Ohio, assignor to The Cincinnati Milling Machine Co., Cincinnati, Ohio, a corporation of Ohio Application May 19, 1955, Serial No. 509,546

27 Claims. (Cl. 51—95)

This invention relates to cutter grinders and more particularly to a new and improved automatic cycle control mechanism therefor.

The primary use of conventional cutter grinders for the grinding or sharpening of helical toothed cutters and the like has necessitated the use of many steps of complex manual manipulations, such as locating the work in the machine, engaging the cutter tooth with a fixed tooth rest, adjusting the grinding wheel to initially "size" the cutter, twisting the cutter to maintain constant pressure between the tooth and tooth rest so as to follow the contour of the cutter tooth, thus presenting the cutting edge thereof in a predetermined relationship with the periphery of the grinding wheel throughout the traverse, and finally indexing the cutter to the next tooth; all of which requires the constant attention of a skilled operator.

Therefore, one of the principal objects of this invention is to provide an automatic cutter grinder which will automatically grind all the teeth on a cutter without requiring the constant attention of a skilled operator.

Another object of this invention is to provide an automatic cutter grinder that is completely universal and adaptable to automatically grind straight toothed, helical toothed, or other non-linear shaped toothed cutters in a complete automatic cycle.

A further object of this invention is to provide an automatic cutter grinder wherein the cutter itself may be utilized to automatically control the rotatable position of the cutter tooth and maintain it in tangential contact with the grinding wheel throughout the traverse of the cutter relative to said grinding wheel.

A further object of this invention is to provide an automatic cutter grinder that will selectively grind in either direction of travel of the cutter relative to the grinding wheel, and/or make any number of grinding operations on each tooth before indexing, and/or index at each or either end of the cutter; all in a completely automatic cycle of operation.

Still another object of this invention is to provide an automatically controlled cutter grinder in which the rotatable position of the cutting edge of the cutter tooth with respect to the periphery of the grinding wheel is effected by a sole prime mover; the rotatable position of which is automatically controlled in a manner to maintain constant pressural contact between the cutter tooth and tooth rest during traverse grinding.

And still another object of this invenion is to provide an automatic controlled cutter grinder which is relatively simple, troublefree, highly accurate, easy to operate and having a short initial setup for a single grinding operation.

Other objects and advantages of the present invention should be readily apparent by reference to the following specification, considered in conjunction with the accompanying drawings forming a part thereof, and it is to be understood that any modifications may be made in the exact structural details there shown and described, without in the scope of the appended claims, without departing from or exceeding the spirit of the invention.

Referring to the accompanying drawings in which like reference characters denote like or similar parts through the several views:

Figure 1 is a side elevation view of the basic machine incorporating a preferred embodiment of the invention.

Figure 2 is a partial elevation of the dog-operated limit switches as viewed along the line 2—2 of Figure 1.

Figure 3 is a plan view taken along the lines 3—3 of Figure 1, showing the relationship between the fixed tooth rest, cutter, and auxiliary tooth rest.

Figure 4 is a diagrammatic view of the associated electrical control circuit.

Figure 5 is a diagrammatic view of the associated electrical control circuit.

Figure 6 is an elementary electrical schematic diagram of the torque motor power circuit.

The sharpening and/or grinding operation on cutters used in the metal working industry has been in the past almost wholly a manual operation. This invention deals with a machine for performing this operation automatically. It is obvious that the cutting edge of a cutter whether straight, curved, or profiled, must be held in a predetermined tangential relationship relative to the periphery of the grinding wheel in order to be sharpened, not only throughout the longitudinal traverse of the cutting edge relative to the wheel, but each succeeding tooth must also be held in the same position so that all of the edges thereof lie in a surface of revolution concentric with the axis of the cutter.

The machine, as shown, is provided with a conventional reversible torque motor mechanically coupled to the cutter to rotate or twist the cutter during traversing of the table in order to effect constant pressural contact between the cutter tooth and a fixed tooth rest.

An electrical control circuit is provided so that any number of successive passes or grinding operations may automatically be made on each tooth before indexing to the next tooth in order to obtain the desired smooth cutting surface on the cutting edge of the tooth and to allow time for "sparking out" of the grinding wheel, thus enhancing grinding accuracy. After the cycle or cycles of grinding is completed on each tooth, the cutter may then be automatically indexed at either or both ends of the traverse, as so desired, in order to present the next tooth to the grinding wheel; thus making the machine completely universal to accommodate any type cutter configurations such as helical toothed, straight toothed, stagger toothed, slab mills, end mills, form cutters, etc.

Where cutters are ground with a tooth rest mounted in such a manner as to move with the cutter and not relative to the cutter, only one tooth rest is required, which may be designated a movable tooth rest. But where cutters are ground with the cutter moving relative to the tooth rest, designated as a fixed tooth rest, two tooth rests are required because the cutter tooth must clear the grinding wheel at each end and therefore will run off of the fixed tooth rest. Therefore, a second or auxiliary tooth rest has been provided in the latter case so that the cutter will always engage one or the other tooth rest.

The auxiliary tooth rest is of a "flipper" type for indexing purposes having a limit switch mounted therein and actuated by a movable finger of the auxiliary tooth rest. The limit switch is electrically connected to the aforementioned electrical control circuit in a manner that upon closure thereof it will operate to effect stopping of the table traverse motor during indexing and, in addition, to effect reversal of the torque motor to index to the next tooth, and upon opening or release thereof to effect a second reversal of the torque motor to bring the following tooth of the cutter in contact with the fixed tooth rest and to effect restarting of the table traverse motor.

The auxiliary tooth rest may be mounted on the table if the total rotation of the cutter, during the grinding operation due to the helical angle, is less than one tooth pitch. If the cutter rotation is more than the tooth pitch, as in slab mills, etc., the auxiliary tooth rest should be mounted on the wheel head so that the cutter moves relative to the auxiliary tooth rest. In all instances where an auxiliary tooth rest is employed, the cutter is held by the auxiliary tooth rest only during indexing of the cutter when the cutter is free of the fixed tooth rest. Therefore, as the cutter moves into grinding position, the cutter will ride upon the radius of the fixed tooth rest and thereby lose contact with the auxiliary tooth rest.

This invention has been embodied in a machine as shown in Figure 1 of the drawings which consists essentially of a bed 10 having spaced longitudinal guideways, not shown, formed thereon for supporting and guiding a movable saddle 11. A work table 12 is reciprocably mounted on guideways 13 formed on the saddle 11 by suitable anti-friction bearings, such as shown in United States Letters Patent No. 1,975,947, granted to Herman R. Isler and Sol Einstein on October 9, 1934.

As shown in the patent, a tubular guide sleeve or column 14, having a protective shroud 15 thereabout is adjustably mounted in a tubular guide formed in the bed 10 for vertical adjustment by a handwheel 16 and has mounted on top thereof a plate member 17 supporting a wheel head 18. A spindle 20' is journaled in the wheel head 18 having a projection therefrom for receiving a grinding wheel 19 secured thereto by a nut 20 threaded thereon. The said column 14 may be vertically adjusted for varying the height of the grinding wheel 19 with respect to the work, and, in addition, the column 14 may also be rotated to change the axis of the grinding wheel 19 angularly with respect to the movement of the table 12, all in a well-known manner. A first prime mover, not shown, such as an electric motor or the like, is mounted in the base 10 with suitable belts or the like for imparting rotation to the grinding wheel 19 in any conventional manner.

A cross feed screw 21 is journaled in the saddle 11 in threaded engagement with a nut, not shown, affixed to the bed 10 in any conventional manner. A hand wheel 22 is attached to each end of the screw 21 whereby the saddle 11 and table 12 may be adjusted toward and from the grinding wheel 19 from the front or the rear of the machine. By this means, the work is fed into the grinding wheel 19 as in cylindrical grinding operations.

The transmission for reciprocating the table 12 may be the same as that shown in the patent supra with the exception that no reversing clutch is necessary as reversal is effected in this embodiment by directly reversing the electric motor 23 which drives the table transmission. This motor 23 may be mounted in the same manner as in the aforementioned patent as shown in Figure 1 of the drawings herein, in which a depending housing 24 supported on the underside of the saddle 11 carries the motor 23. Thus, the motor 23 and transmission are adjustable crosswise with the saddle 11. Manual adjustments of the table 12 may be effected by the handwheels 25 mounted on either end of a shaft 26 which may be operatively connected to the table transmission in the same manner as shown in said aforementioned patent.

With reference to Figure 3 of the drawings, a headstock 27 and a tailstock 28 are mounted on either end of the table 12 in any conventional manner for receiving therebetween a rotatable arbor 29 carrying the cutter or work 30 to the ground therebetween. A driving dog 31 is affixed to the arbor 29 and operatively connected to the headstock 27 for driving the work 30. A conventional reversible electric torque motor 32 is mounted on the table 12 having its output shaft 32' operatively connected to drive the headstock 27 through suitable pulleys 33 and 34 and belt 35, all of which constitutes means for providing rotational or indexable movement to the work 30.

A fixed tooth rest mechanism, indicated generally by the reference numeral 36, is provided and consists essentially of an adjustable horizontally disposed arm 37 for engagement with a tooth of the cutter or work 30 and slidably mounted on a post 38 and locked thereto by any suitable method. The post 38 is secured by a clamp bracket 39 which is attached to the plate 17 by a bolt 40 threaded therein. Therefore, it can be seen that the vertical position of the arm 37 may be adjusted to present the cutting edge of the cutter tooth in a predetermined grinding relation relative to the periphery of the grinding wheel 19, and then may be locked in said adjusted position.

It has been found that for automatic indexing, the cutter 30 must be free of the grinding wheel 19 and tooth rest 36 after grinding each tooth. Therefore, an auxiliary tooth rest mechanism has been devised to maintain the position of the cutter tooth after the cutter 30 has run free of the grinding wheel 19. With reference to Figures 1 and 3 of the drawings, the auxiliary tooth rest mechanism, indicated generally by the reference numeral 41, consists essentially of a mounting bracket assembly 42 secured to the wheel head 18 by suitable bolts 43. A horizontally disposed shaft 44 is rotatably mounted in a bore formed in the lower end of the bracket 42 and has horizontally disposed arms 45 and 46 adjustably mounted on the ends of the shaft 44 and each in engagement with a tooth of the cutter 30. The arms 45 and 46 may be properly adjusted to accommodate cutters having different helical angles and then may be locked in said adjusted position by any suitable means. An actuator 47 is formed on the shaft 44 for actuating a limit switch 1LS mounted on the bracket 42. Therefore, it can be seen that if either arm 45 or 46 is cammed downward by the cutter tooth during indexing, the actuator 47 will move upward to actuate the limit switch 1LS.

A more complete understanding of the foregoing description may be had by analysis of the control circuitry as shown in Figures 4, 5 and 6 described in conjunction with a description of an actual working condition.

It may be well to note at the outset that for the sake of convenience of description and to enhance the ease of comprehension of the electrical circuitry, as shown in Figures 4 and 5, it will be noted that a vertical scale E1 has been provided and located at the right edge thereof in such a manner so as to provide horizontal consecutively numbered reference lines from E2 to E43. Each electrical component hereinafter mentioned will be located on one of said reference lines and will so be referred.

It will be assumed that the work 30 has been properly mounted in the machine as shown in Figure 1, and that the fixed tooth rest 36 and the auxiliary tooth rest 41 have been properly adjusted in their respective positions relative to the work and the grinding wheel 19 has been fed forward to initially "size" a cutter tooth.

Machining cycle of operation

Suppose the cutter 30 is of such a nature that it is desirous to index on both ends thereof, and also to make three grinding operations or passes on each tooth before indexing. Again too, suppose the contour of the cutter teeth is of such a configuration that it is necessary for the torque motor 32 to apply counterclockwise torque to the cutter as viewed in Figure 1.

Therefore, the slider of the index setting switch SW-4 on line E21 is set to "both"; the slider of the traverse setting switch SW-6 on line E25 is set opposite the numeral "3" on the dial; and the direction of torque setting switch SW-7 on line E32 is set at CC for "counterclockwise" as shown in Figure 5.

Now, assuming that the cutter has been mounted as shown in Figure 1, when the main power switch SW-1 on line E2 is closed, single phase D. C. voltage will be supplied to the primary winding of the power transformer T1 which will actuate the feed lines L1 and L2 connected to the secondary winding thereof.

At the "start" push button PB-2 on line E3 is actuated, the relay coil 15CR will be energized which will close contacts 15CR-1 on line E4 to maintain 15CR energized and contacts 15CR-2 and 15CR-3 on line E3 close to activate the feed lines L3 and L4.

When the feed lines L3 and L4 are activated, the relay coils LEA on line E6, 5CR on line E7, 7CR on line E27, and RT on line E32 will be energized.

When the feed lines L3 and L4 are energized, they serve to energize the primary of the transformer T (lines E33 and E34) whose secondary is coupled by lines L5 and L6 to the rectifier RE (line E36) to supply D. C. current to the power traversing motor 23. This current is carried by the D. C. feed lines L7 and L8, the rectifier circuit being provided with the conventional resistance R11 and condenser CON shown in line E37.

When the relay coil LEA is energized, contacts LEA-1, LEA-2, and LEA-3, in Figure 6 close to insert the resistors R4, R6, and R8, respectively, in series with the power lines of the torque motor 32, and contacts LEA-4 on line E13 close to energize the relay coil 6CR. When the relay coil 5CR is energized, contacts 5CR-1 on line E11 open to prevent the reversing relay coil LEB from being energized simultaneously with coil LEA. When the relay coil 7CR is energized, contacts 7CR-1, 7CR-2, and 7CR-3 in Figure 6 close to short out the series resistors R1, R2, and R3 respectively. When the relay coil RT is energized, contacts RT-1 and RT-2, Figure 6, close to complete the circuit from the 60 cycle 3 phase power source to the torque motor 32, thus causing the armature thereof to rotate in a counterclockwise direction to engage the cutter tooth with the fixed tooth rest 36 as shown in Figure 1. As the relay coil 6CR on line E13 is energized, contacts 6CR-1 on line E14 close.

If it is desirous to start the initial feeding of the cutter 30 to the left or downward as viewed in Figure 3 relative to the grinding wheel 19, the "L-cycle start" push button PB-4 on line E19 is actuated to energize the relay coil 10CR.

When the relay coil 10CR is energized, contacts 10CR-1 on line E26 close; contacts 10CR-2 on line E18 close to maintain coil 10CR energized; contacts 10CR-3 and 10CR-4 on line E42 close to energize the armature of the table traverse motor 23 and thus the armature thereof will rotate at a speed depending upon the setting of the series connected potentiometer R10 and will rotate in such a direction so as to feed the table 12 and cutter 30 to the left relative to the grinding wheel 19.

The table 12 and cutter 30 will continue to be traversed to the left until a limit switch 3LS mounted on the base 10 is actuated by a dog 50 carried by the table 12, Figure 2. When the limit switch 3LS is actuated, its contacts 3LS-1 on line E20 will close to energize the "R traverse" relay coil 12CR.

When the coil 12CR is energized, contacts 12CR-1 on line E18 open to deenergize the relay coil 10CR; contacts 12CR-2 on line E21 close to energize the relay coil 14CR; contacts 12CR-3 on line E14 close to energize the relay coil 11CR; and contacts 12CR-4 on line E23 close.

As the coil 10CR is deenergized, contacts 10CR-1 on line E26 open; contacts 10CR-2 on line E18 open; and contacts 10CR-3 and 10CR-4 on line E42 open to stop rotation of the table traverse motor 23 to permit reversal thereof. When the relay coil 14CR is energized, contacts 14CR-1 on line E25 close and contacts 14CR-2 on line E38 close to energize a conventional stepping relay coil SR. When the coil 11CR is energized, contacts 11CR-1 on line E28 close, contacts 11CR-2 on line E15 close to maintain the coil 11CR energized, and contacts 11CR-3 and 11CR-4 on lines E43 and E41, respectively, close to reverse the voltage across the armature of the table traverse motor 23. Therefore, the table 12 and cutter 30 will be reversed and will be traversed from left to right with respect to the grinding wheel 14 or upward as viewed in Figure 3.

When the stepping relay SR on line E38 is energized, the pawl (not shown), forming an integral part of the commercial stepping relay, will move downward to engage the lever arm thereof with the next tooth on a ratchet wheel therein and at the same time will open contacts SR-1 on line E39. The aforementioned stepping relay is of the conventional rotary telephone type as readily available on the market and as manufactured by Automatic Electric Company and fully described in their bulletin 473 and comprises a bank of three-pronged rotary wiper blades which are moved from one set of studs to the next by a pawl which, upon energization of the relay, is advanced by the armature of the relay to pick up the next tooth of a ratchet wheel turning with the wiper blades. When the relay is deenergized, a driving spring restores the armature and the pawl and, in so doing, advances the wiper blades to the next set of studs. After the table 12 has reversed direction of travel, the limit switch 3LS is released by the dog 50 and its contacts 3LS-1 on line E20 open to deenergize the relay coil 12CR.

When the relay coil 12CR is deenergized, contacts 12CR-1 on line E18 close; contacts 12CR-2 on line E21 open to deenergize the relay coil 14CR; contacts 12CR-3 on line E14 open but the coil 11CR remains energized; and contacts 12CR-4 on line E23 open. When the coil 14CR is deenergized, contacts 14CR-1 on line E25 open and contacts 14CR-2 on line E38 open to deenergize the stepping relay coil SR. When the coil SR is deenergized, contacts SR-1 on line E39 close and also the lever arm of the stepping relay will ratchet the wheel thereof and thus the movable arms of the rotary switches SW-5, on line E25 and SW-8 on line E39, being mechanically coupled to said ratchet wheel, will likewise be ratcheted one division upward to point "2," thus indicating that one grinding operation has been made on the cutter tooth and the second grinding operation thereon is now beginning to commence.

The table traverse motor 23 will continue to traverse the cutter 30 and table 12 until a limit switch 2LS mounted on the base 10 is actuated by a dog 51 carried by the table 12, Figure 2. When the limit switch 2LS is actuated, its contacts 2LS-1 on line E19 close to energize the relay coil 9CR. When the coil 9CR is energized, contacts 9CR-1 on line E15 open to deenergize the relay coil 11CR; contacts 9CR-2 on line 22 close to energize the relay coil 14CR; contacts 9CR-3 on line E17 close to energize the relay coil 10CR; and contacts 9CR-4 on line E25 close.

When the coil 11CR is deenergized, contacts 11CR-1 on line E28 open; contacts 11CR-2 on line E15 open; contacts 11CR-3 and 11CR-4 on lines E43 and E41 respectively, open to remove the voltage from across the armature of the table traverse motor 23 to permit reversal thereof. When the coil 14CR is energized, contacts 14CR-1 on line E25 close and contacts 14CR-2 on line E38 close to again energize the stepping relay coil SR.

When the relay coil 10CR is energized, contacts 10CR-1 on line E27 close; contacts 10CR-2 on line E18 close to maintain the coil 10CR energized; and contacts 10CR-3 and 10CR-4 on line E42 close to reverse the voltage across the armature of the table traverse motor 23 to reverse direction of travel of the table 12, and drive the cutter 30 from right to left with respect to the grinding wheel 19. When the stepping relay coil SR on line E38 is energized, the pawl thereof drives the lever arm downward to pick up the next tooth on the ratchet wheel.

As the table 12 again starts its forward traverse, the limit switch 2LS is released by the dog 51 and its contacts 2LS-1 on line E19 open to deenergize the relay coil 9CR. As the coil 9CR is deenergized, contacts 9CR-1 on line E15 close; contacts 9CR-2 on line E22 open to deenergize the relay coil 14CR; contacts 9CR-3 on line E17 open but the coil 10CR remains energized; and contacts 9CR-4 on line E25 open.

When the coil 14CR is deenergized, contacts 14CR-1 on line E25 open and contacts 14CR-2 on line E38 open to deenergize the stepping relay coil SR. When the coil SR is deenergized, contacts SR-1 on line E39 close and also the lever arm of the stepping relay will ratchet the wheel thereof and thus the movable arms of the rotary switches SW-5 on line E25, and SW-8 on line E39, will likewise be ratcheted one more division as heretofore described to point "3," thus indicating that two grinding operations have been made on the cutter tooth and the third operation is about to begin.

During the third grinding operation on the same cutter tooth, the table 12 and cutter 30 will again be traversed to the left with respect to the grinding wheel 19 until the limit switch 3LS is again actuated by the dog 50. When the limit switch 3LS is actuated, its contacts 3LS-1 on line E20 will close to energize the "R traverse" relay coil 12CR to open contacts 12CR-1 on line E18 to deenergize the relay coil 10CR; close contacts 12CR-2 on line E21 to energize the relay coil 14CR; close contacts 12CR-3 on line E14 to energize the relay coil 11CR; and close contacts 12CR-4 on line E23.

When the coil 10CR is deenergized, contacts 10CR-1 on line E26 open; contacts 10CR-2 on line E18 open; and contacts 10CR-3 and 10CR-4 on line E42 open to stop rotation of the table traverse motor 23 to permit reversal thereof. When the relay coil 14CR is energized, contacts 14CR-1 on line E25 close and energize the relay coil 8CR as the movable arms of the rotary switches SW-5 and SW-6 are now aligned, and contacts 14CR-2 on line E38 close to energize the stepping relay coil SR. When the coil 11CR is energized, contacts 11CR-1 on line E28 close; contacts 11CR-2 on line E15 close to maintain the coil 11CR energized; and contacts 11CR-3 and 11CR-4 on lines E43 and E41, respectively, close to reverse the voltage across the armature of the table traverse motor 23 to traverse the table 12 and cutter 30 to the right with respect to the grinding wheel 19.

When the coil 8CR is energized, contacts 8CR-1 on line E23 close; contacts 8CR-2 on line E11 close to energize the relay coil 2CR on line E8; and contacts 8CR-3 on line E12 open. When the coil 2CR is energized, contacts 2CR-1 on line E13 open to deenergize the relay coil 6CR; contacts 2CR-2 on line E6 open to deenergize the relay coils LEA and 5CR; and contacts 2CR-3 on line E8 close to maintain the coil 2CR energized.

As the coil 6CR is deenergized, contacts 6CR-1 on line E14 open to deenergize the relay coil 11CR. As the coil LEA is deenergized, contacts LEA-1, LEA-2, and LEA-3, Figure 6, open to remove the power from the torque motor 32 to permit reversal thereof and contacts LEA-4 on line E13 open. As the coil 5CR is deenergized, contacts 5CR-1 on line E11 close to energize the relay coil LEB. As the coil 11CR is deenergized, contacts 11CR-1 on line E28 open; contacts 11CR-2 on line E15 open; and contacts 11CR-3 and 11CR-4 on lines E43 and E41 respectively, open to stop the table traverse motor 23 until indexing of the cutter 30 to the next tooth has been completed.

When the coil LEB is energized, contacts LEB-1, LEB-2, and LEB-3, Figure 6, close to reverse the phase of the input voltage to the torque motor 32 and at the same time inserting resistors R5, R7, and R9 respectively, in series with the power lines, and contacts LEB-4 on line E24 close to maintain the coil 8CR energized. Therefore, as the phase of the input voltage to the torque motor 32 has been reversed, the armature thereof will tend to rotate in a clockwise direction to index the cutter 30 to the next tooth.

As the cutter 30 starts to rotate in a clockwise direction, the next tooth thereof cams the finger 45, Figure 3, outward, and the limit switch 1LS will be actuated thereby. When the limit switch 1LS is actuated, its contacts 1LS-1 on line E5 close to energize the relay coil 1CR which close contacts 1-CR-1 on line E10 to energize the relay coil 4CR; and open contacts 1CR-2 on line E6 to deenergize the relay coil 2CR.

When the coil 2CR is deenergized, contacts 2CR-1 on line E13 close to energize the relay coil 6CR which close contacts 6CR-1 on line E14, contacts 2CR-2 on line E6 close; and contacts 2CR-3 on line E8 open. When the coil 4CR is energized, contacts 4CR-1 on line E9 open; contacts 4CR-2 on line E9 close to maintain coil 4CR energized; contacts 4CR-3 on line E29 close to energize the relay coils 3CR and 1TR; and contacts 4CR-4 on line E38 open.

As the coil 3CR is energized, contacts 3CR-1 on line E30 close to maintain the coils 3CR and 1TR energized, and contacts 3CR-2 on line E39 close. Since the contacts 4CR-4 in line E38 are now open, the coil of stepping relay SR will now be under the control of its own contacts SR-1 in line E39. When these contacts are closed, the relay will be energized through the contacts SW-8 and 3CR-2. Energization of the relay SR will, however, cause the contacts SR-1 to open, thereby deenergizing the relay, and this make and break action with corresponding advancement of the wiper blades will continue until the next set of wiper blades is brought around to the "1" or starting position ready for the next sequence of operation. As shown in Fig. 5, all of the studs except the first two in the bank SW-8, which bank controls the resetting of the stepping relay, are electrically interconnected to cause resetting to take place in the above-described manner whenever the contacts 3CR-2 in line E39 are closed. When the timer relay 1TR is energized, contacts 1TR-1 on line E29 do not open immediately but will be timed to open after completion of the indexing operation, and contacts 1TR-2 on line E38 open immediately.

Now, as the cutter 30 continues to rotate in a clockwise direction, the finger 45 will run off the next tooth and thus the limit switch 1LS will be released and its contacts 1LS-1 on line E5 will open to deenergize the relay coil 1CR. When the coil 1CR is deenergized, contacts 1CR-1 on line E10 open; and contacts 1CR-2 on line E6 close to energize the relay coils LEA and 5CR.

When the coil 5CR is energized, contacts 5CR-1 on line E11 open to deenergize the relay coil LEB which open contacts LEB-1, LEB-2, and LEB-3, Figure 6, to stop rotation of the torque motor 32 to permit reversal thereof, and open contacts LEB-4 on line E24 to deenergize the relay coil 8CR. When the coil LEA is energized, contacts LEA-1, LEA-2, and LEA-3, Figure 6, close to reverse direction of rotation of the armature of the torque motor 32 to rotate the cutter 30 now in a counterclockwise direction to bring the next tooth in contact with the fixed tooth rest 36, and contacts LEA-4 on line E13 close to energize the relay coil 6CR to close contacts 6CR-1 on line E14 to energize the relay coil 11CR.

As the coil 8CR is deenergized, contacts 8CR-1 on line E23 open; contacts 8CR-2 on line E11 open to deenergize the relay coil 4CR; and close contacts 8CR-3 on line E12. As the coil 4CR is deenergized, contacts 4CR-1 on line E9 close; contacts 4CR-2 on line E9 open; contacts 4CR-3 on line E29 open; and contacts 4CR-4 on line E38 close.

Now that the indexing is complete and the next tooth on the cutter is aligned with the positive stop 36, the timed open contacts 1TR-1 on line E29 open to deenergize the relay coil 3CR. When the coil 3CR is deenergized, contacts 3CR-1 on line E30 open to deenergize the timer relay coil 1TR and contacts 3CR-2 on line E39 open.

When the coil 1TR is deenergized, contacts 1TR-1 on line E29 close and contacts 1TR-2 on line E38 close. When the coil 11CR is energized, contacts 11CR-1 on line E28 open; contacts 11CR-2 on line E15 close to maintain the coil 11CR energized; and contacts 11CR-3 and 11CR-4 on lines E43 and E41 respectively, close to reenergize the armature of the table traverse motor 23 to begin the next cycle of grinding operation on the next cutter tooth.

*Jog indexing*

During the initial set-up, it may be desired to index the cutter 30 one tooth at a time while the table is stationary. Therefore, a jog pushbutton PB-5 on line E11 is provided so that as PB-5 is depressed, coils LEB on line E11 and 2CR on line E8 will be energized. As the coil 2CR is deenergized, contacts 2CR-2 on line E6 open to deenergize the coil LEA. Therefore, with reference to Figure 6 it can be seen that as coil LEB is now energized and LEA deenergized, contacts LEA-1, LEA-2, and LEA-3 open and contacts LEB-1, LEB-2, and LEB-3 close and thus the armature of the torque motor 32 reverses to index the cutter 30 clockwise one tooth which cams the auxiliary tooth rest 41 as heretofore mentioned and described, and thus the contacts 8CR-3 on line E12 open to deenergize the relay coils LEB and 2CR. As the coil 2CR is deenergized, contacts 2CR-2 on line E6 close to energize the coil LEA. Therefore, the contacts LEB in Figure 6 open and contacts LEA close to reverse the direction of rotation of the armature of the torque motor 32 and thus the cutter 30 will be rotated counterclockwise to bring the next tooth thereon in alignment with the fixed tooth rest 36.

*Helix compensation*

In the sharpening of helical or the like cutters, it is to be noted that in one direction of travel of the table, twisting torque will be applied to the cutter against the fixed tooth rest in the same direction as the helix of the cutter, but in the opposite direction of travel of the table, the twisting torque of cutter against tooth rest will be in the opposite direction as the helix of the cutter. Therefore, it can be seen that there will be a considerable difference in the frictional resistance or drag between the cutter and tooth rest with one direction of travel of the table than with the opposite direction of travel of the table.

Therefore, a "helix compensation" selector switch SW-9 on line E27 has been provided so that if the switch SW-9 is moved upward or downward from the position as shown depending upon the direction of the helix of the cutter and direction of travel of the table during the initial grinding operation, the relay coil 7CR will be selectively energized by closure of the contacts 11CR-1 or 10CR-1; the coils 11CR and 10CR governing the direction of rotation of the table traverse motor 23 as shown on line E42. As the coil 7CR is selectively energized, contacts 7CR-1, 7CR-2, and 7CR-3 as shown in Figure 6 will be selectively inserted or removed from the feed lines of the torque motor 32. Therefore, the amount of torque as supplied by the torque motor 32 will be more or less, depending on the direction of travel of the table 12, thus providing constant contact pressure between the cutter tooth and tooth rest 36 at all times.

Therefore, there has thus been provided a completely automatic cutter grinder that is completely universal to accommodate a multitude of different cutter types that can be ground on this machine, and being fully described herein, what is claimed as new and improved and desired to secure by Letters Patent is:

1. In a cutter grinder having a table, a grinding wheel, a base for supporting said table and grinding wheel in opposed relation, and means on the table including a headstock to support and rotate a toothed cutter work, the combination of a first prime mover for reciprocating said table traversely of said grinding wheel, a source of power, a first power operable switching means for connecting said first prime mover to said power source to effect forward feeding of said table, a second power operable switching means for reversely connecting said first prime mover to said power source to effect return of said table, a tooth rest means mounted on said base, a second prime mover operatively connected to said headstock to rotate said cutter in one direction to effect and maintain engagement of a tooth of said cutter with said tooth rest during traversing of said table, a third power operable switching means to connect said second prime mover to said power source to cause rotation thereof in said one direction, a fourth power operable switching means to reversibly connect said second prime mover to said power source to effect reversal thereof to index said cutter work, and an electrical control circuit connected to said switching means for cyclic energization thereof including: a starting switch actuable to effect energization of said first and third switching means, a limit switch trip operable during feeding of said table to effect simultaneous deenergization of said first switching means and energization of said second switching means, a limit switch trip operable during return of said table to effect simultaneous deenergization of said second and third switching means and energization of said first and fourth switching means, a limit switch trip operable by said cutter during indexing thereof to effect simultaneous denergization of said fourth switching means and energization of said third switching means, and a stopping switch actuable to deenergize said switching means to remove said power source from said prime movers.

2. In a cutter grinder having a table, a grinding wheel, a base for supporting said table and grinding wheel in opposed relation, and means on the table including a headstock to support and rotate a toothed cutter work, the combination of a reversible electric traverse motor operatively connected for reciprocating said table traversely of said grinding wheel, a source of electric power, a first power operable switching means for connecting said traverse motor to said power source to effect forward feeding of said table, a second power operable switching means for reversely connecting said traverse motor to said power source to effect return of said table, a tooth rest means mounted on said base, a reversible electric torque motor operatively connected to said headstock to rotate said cutter in one direction to effect and maintain engagement of a tooth of said cutter with said tooth rest during traversing of said table, a third power operable switching means to connect said torque motor to said power source to cause rotation thereof in said one direction, a fourth power operable switching means to reversibly connect said torque motor to said power source to effect reversal thereof to index said cutter work, and an electrical control circuit connected to said switching means for cyclic energization thereof including: a starting switch actuable to effect energization of said first and third switching means, a limit switch trip operable during feeding of said table to effect simultaneous deenergization of said first switching means and energization of said second switching means, a limit switch trip operable during return of said table to effect simultaneous deenergization of said second and third switching means and energization of said first and fourth switching means, a limit switch trip operable by said cutter during indexing thereof to effect simultaneous deenergization of said fourth switching means and energization of said third switching means and a stopping switch actuable to deenergize said switching means to remove said power from traverse and torque motors.

3. In a cutter grinder having a table, a grinding wheel, a base for supporting said table and grinding wheel in opposed relation and means on the table including a headstock to support and rotate a toothed cutter work, the combination of a first prime mover for reciprocating said table traversely of said grinding wheel, a source of power, a first power operable switching means for connecting said first prime mover to said power source to effect forward feeding of said table, a second power operable switching means for reversely connecting said first prime mover to said power source to effect return of said table, a tooth rest means mounted on said base, a second prime mover operatively connected to said headstock to rotate said cutter in one direction to effect and maintain engagement of a tooth of said cutter with said tooth rest during traversing of said table, a third power operable switching means to connect said second prime mover to said power source to cause rotation thereof in said one direction, a fourth power operable switching means to reversibly connect said second prime mover to said power source to effect reversal thereof to index said cutter work and an electrical control circuit connected to said switching means for cyclic energization thereof including: a starting switch actuable to effect energization of said first and third switching means, a first limit switch trip operable during feeding of said table to effect simultaneous deenergization of said first and third switching means and energization of said second and fourth switching means, a second limit switch trip operable by said cutter during indexing thereof to effect simultaneous deenergization of said fourth switching means and energization of said third switching means, a third limit switch trip operable during return of said table to effect simultaneous deenergization of said second and third switching means and energization of said first and fourth switching means, said second limit switch again trip operable by said cutter during indexing thereof to effect simultaneous deenergization of said fourth switching means and energization of said third switching means, and a stopping switch actuable to deenergize said switching means to remove said power from said prime movers.

4. In a cutter grinder having a table, a grinding wheel, a base for supporting said table and grinding wheel in opposed relation, and means on the table including a headstock to support and rotate toothed cutter work, the combination of a reversible electric traverse motor operatively connected for reciprocating said table transversely of said grinding wheel, a source of electric power, a first power operable switching means for connecting said traverse motor to said power source to effect forward feeding of said table, a second power operable switching means for reversely connecting said traverse motor to said power source to effect return of said table, a tooth rest means mounted on said base, a reversible electric torque motor operatively connected to said headstock to rotate said cutter in one direction to effect and maintain engagement of a tooth of said cutter with said tooth rest during traversing of said table, a third power operable switching means to connect said torque motor to said power source to cause rotation thereof in said one direction, a fourth power operable switching means to reversibly connect said torque motor to said power source to effect reversal thereof to index said cutter work, an electrical control circuit connected to said switching means for cyclic energization thereof including: a starting switch actuable to effect energization of said first and third switching means, a first limit switch trip operable during feeding of said table to effect simultaneous deenergization of said first and third switching means and energization of said second and fourth switching means, a second limit switch trip operable by said cutter during indexing thereof to effect simultaneous deenergization of said fourth switching means and energization of said third switching means, a third limit switch trip operable during return of said table to effect deenergization of said second and third switching means and energization of said first and fourth switching means, said second limit switch again trip operable by said cutter during indexing thereof to effect simultaneous deenergization of said fourth switching means and energization of said third switching means, and a stopping switch actuable to deenergize said switching means to remove said power from said traverse and torque motors.

5. In a cutter grinder having a table, a grinding wheel, a base for supporting said table and grinding wheel in opposed relation and means on the table including a headstock to support and rotate a toothed cutter work, the combination of a first prime mover for reciprocating said table traversely of said grinding wheel, a source of power, a first power operable switching means for connecting said first prime mover to said power source to effect forward feeding of said table, a second power operable switching means for reversely connecting said first prime mover to said power source to effect return of said table, a tooth rest means mounted on said base, a second prime mover operatively connected to said headstock to rotate said cutter in one direction to effect and maintain engagement of a tooth of said cutter with said tooth rest during traversing of said table, a third power operable switching means to connect said second prime mover to said power source to cause rotation thereof in said one direction, a fourth power operable switching means to reversibly connect said second prime mover to said power source to effect reversal thereof to index said cutter work, and an electrical control circuit connected to said switching means for cyclic energization thereof including: a starting switch actuable to effect energization of said first and third switching means to effect a first cycle of grinding operation on said cutter tooth, a first limit switch trip operable during feeding of said table to effect simultaneous deenergization of said first switching means and energization of said second switching means to effect a second cycle of grinding operation on said cutter tooth, a second limit switch operable during return of said table to effect simultaneous deenergization of said second switching means and energization of said first switching means, power operable counting means sequentially actuable by said first and second limit switches a predetermined number of times to effect deenergization thereafter of said third switching means and energization of said fourth switching means, a third limit switch trip operable by said cutter during indexing thereof to deenergize said fourth switching means and energization of said third switching means, and a stopping switch actuable to deenergize said switching means to remove said power source from said prime movers.

6. In a cutter grinder having a table, a grinding wheel, a base for supporting said table and grinding wheel in opposed relation, and means on the table including a headstock to support and rotate a toothed cutter work, the combination of a reversible electric traverse motor operatively connected for reciprocating said table traversely of said grinding wheel, a source of electric power, a first power operable switching means for connecting said traverse motor to said power source to effect forward feeding of said table, a second power operable switching means for reversely connecting said traverse motor to said power source to effect return of said table, a tooth rest means mounted on said base, a reversible electric torque motor operatively connected to said headstock to rotate said cutter in one direction to effect and maintain engagement of a tooth of said cutter with said tooth rest during traversing of said table, a third power operable switching means to connect said torque motor to said power source to cause rotation thereof in said one direction, a fourth power operable switching means to reversely connect said torque motor to said power source to effect reversal thereof to index said cutter work, and an electrical control circuit connected to said switching means for cyclic energization thereof including: a starting switch actuable to effect energization of said first and third switching means to effect a first cycle of grinding operation on said cutter tooth, a first limit switch trip operable during feeding of said table to effect simultaneous deenergization of said first switching means and energization of said second switching means to effect a second cycle of grinding operation on said cutter tooth, a second limit switch trip operable during return of said table to effect simultaneous deenergization of said second switching means and energization of said first switching means, power operable counting means sequentially actuable by said first and second limit switches a predetermined number of times to thereafter effect deenergization of said third switching means and energization of said fourth switching means, a third limit switch trip operable by said cutter during indexing to deenergize said fourth switching means and energization of said third switching means and a stopping switch actuable to deenergize said switching means to remove said power from said traverse and torque motors.

7. In a cutter grinder having a table, a grinding wheel, a base for supporting said table and grinding wheel in opposed relation and means on the table including a headstock to support and rotate a toothed cutter work, the combination of a first prime mover for reciprocating said table traversely of said grinding wheel, a source of power, a first power operable switching means for connecting said first prime mover to said power source to effect forward feeding of said table, a second power operable switching means for reversely connecting said first prime mover to said power source to effect return of said table, a tooth rest means mounted on said base, a second prime mover operatively connected to said headstock to rotate said cutter in one direction to effect and maintain engagement of a tooth of said cutter with said tooth rest during traversing of said table, a third power operable switching means to connect said prime mover to said power source to cause rotation thereof in said one direction, a fourth power operable switching means to reversibly connect said second prime mover to said power source to effect reversal thereof to index said cutter work, a plurality of resistors, a fifth power operable switching means to insert said resistances in series with said power source and said second prime mover to effect reduction of the output torque thereof, and an electrical control circuit connected to said switching means for cyclic energization thereof including: a starting switch actuable to effect energization of said first and third switching means, a first limit switch trip operable during feeding of said table to effect simultaneous deenergization of said first and third switching means and energization of said second, fourth, and fifth switching means, a second limit switch trip operable by said cutter during indexing thereof to effect simultaneous deenergization of said fourth switching means and energization of said third switching means, a third limit switch trip operable during return of said table to effect simultaneous deenergization of said second, third and fifth switching means and energization of said first and fourth switching means, said second limit switch again trip operable by said cutter during indexing thereof to effect simultaneous deenergization of said fourth switching means and energization of said third switching means, and a stopping switch actuable to deenergize said switching means to remove said power from said prime movers.

8. In a cutter grinder having a table, a grinding wheel, a base for supporting said table and grinding wheel in opposed relation, and means on the table including a headstock to support and rotate toothed cutter work, the combination of a reversible electric traverse motor operatively connected for reciprocating said table transversly of said grinding wheel, a source of electric power, a first power operable switching means for connecting said traverse motor to said power source to effect forward feeding of said table, a second power operable switching means for reversely connecting said traverse motor to said power source to effect return of said table, a tooth rest means mounted on said base, a reversible electric torque motor operatively connected to said headstock to rotate said cutter in one direction to effect and maintain engagement of a tooth of said cutter with said tooth rest during traversing of said table, a third power operable switching means to connect said torque motor to said power source to cause rotation thereof in said one direction, a fourth power operable switching means to reversibly connect said torque motor to said power source to effect reversal thereof to index said cutter work, a plurality of resistors, a fifth power operable switching means to insert said resistances in series with said power source and said torque motor to effect reduction of the output torque thereof, and an electrical control circuit connected to said switching means for cyclic energization thereof including: a starting switch actuable to effect energization of said first and third switching means, a first limit switch trip operable during feeding of said table to effect simultaneous deenergization of said first and third switching means and energization of said second, fourth, and fifth switching means, a second limit switch trip operable by said cutter during indexing thereof to effect simultaneous deenergization of said fourth switching means and energization of said third switching means, a third limit switch trip operable during return of said table to effect simultaneous deenergization of said second, third and fifth switching means and energization of said first and fourth switching means, said second limit switch again trip operable by said cutter during indexing thereof to effect simultaneous deenergization of said fourth switching means and energization of said third switching means, and a stopping switch actuable to deenergize said switching means to remove said power from said traverse and torque motors.

9. In a cutter grinder having a table, a grinding wheel, a base for supporting said table and grinding wheel in opposed relation, and means on the table including a headstock to support and rotate a toothed cutter work, the combination of a first prime mover for reciprocating said table traversely of said grinding wheel, a source of power, a first power operable switching means for connecting said first prime mover to said power source to effect forward feeding of said table, a second power operable switching means for reversely connecting said first prime mover to said power source to effect return of said table, a horizontally pivotable tooth rest means mounted on said table and actuable by said cutter work, a second prime mover operatively connected to said headstock to rotate said cutter in one direction to effect and maintain engagement of a tooth of said cutter with said tooth rest during traversing of said table, a third power operable switching means to connect said second prime mover to said power source to cause rotation thereof in said one direction, a fourth power operable switching means to reversibly connect said second prime mover to said power source to effect reversal thereof to index said cutter work, and an electrical control circuit connected to said switching means for cyclic energization thereof including: a starting switch actuable to effect energization of said first and third switching means, a limit switch trip operable during feeding of said table to effect simultaneous deenergization of said first switching means and energization of said second switching means, a limit switch trip operable during return of said table to effect simultaneous deenergization of said second and third switching means and energization of said first and fourth switching means, a limit switch trip operable by said tooth rest during indexing of said cutter to effect simultaneous deenergization of said fourth switching means and energization of said third switching means, and a stopping switch actuable to deenergize said switching means to remove said power source from said prime movers.

10. In a cutter grinder having a table, a grinding wheel, a base for supporting said table and grinding wheel in opposed relation, and means on the table including a headstock to support and rotate a toothed cutter work, the combination of a reversible electric traverse motor operatively connected for reciprocating said table traversely of said grinding wheel, a source of electric power, a first power operable switching means for connecting said traverse motor to said power source to effect forward feeding of said table, a second power operable switching means for reversely connecting said traverse motor to said power source to effect return of said table, a horizontally pivotable tooth rest means mounted on said table and actuated by said cutter work, a reversible electric torque motor operatively connected to said headstock to rotate said cutter in one direction to effect and maintain engagement of a tooth of said cutter with said tooth rest during traversing of said table, a third power operable switching means to connect said torque motor to said power source to cause rotation thereof in said one direction, a fourth power operable switching means to reversibly connect said torque motor to said power source to effect reversal thereof to index said cutter work, and an electrical control circuit connected to said switching means for cyclic energization thereof including: a starting switch actuable to effect energization of said first and third switching means, a limit switch trip operable during feeding of said table to effect simultaneous deenergization of said first switching means and energization of said second switching means, a limit switch trip operable during return of said table to effect simultaneous deenergization of said second and third switching means and energization of said first and fourth switching means, a limit switch trip operable by said tooth rest during indexing of said cutter to effect simultaneous deenergization of said fourth switching means and energization of said third switching means and a stopping switch actuable to deenergize said switching means to remove said power from traverse and torque motors.

11. In a cutter grinder having a table, a grinding wheel, a base for supporting said table and grinding wheel in opposed relation and means on the table including a headstock to support and rotate a toothed cutter work, the combination of a first prime mover for reciprocating said table transversely of said grinding wheel, a source of power, a first power operable switching means for connecting said first prime mover to said power source to effect forward feeding of said table, a second power operable switching means for reversely connecting said first prime mover to said power source to effect return of said table, a horizontally pivotable tooth rest means mounted on said table and actuated by said cutter work, a second prime mover operatively connected to said headstock to rotate said cutter in one direction to effect and maintain engagement of a tooth of said cutter with said tooth rest during traversing of said table, a third power operable switching means to connect said second prime mover to said power source to cause rotation thereof in said one direction, a fourth power operable switching means to reversibly connect said second prime mover to said power source to effect reversal thereof to index said cutter work, and an electrical control circuit connected to said switching means for cyclic energization thereof including: a starting switch actuable to effect energization of said first and third switching means, a first limit switch trip operable during feeding of said table to effect simultaneous deenergization of said first and third switching means and energization of said second and fourth switching means, a second limit switch trip operable by said tooth rest during indexing of said cutter to effect simultaneous deenergization of said fourth switching means and energization of said third switching means, a third limit switch trip operable during return of said table to effect simultaneous deenergization of said second and third switching means and energization of said first and fourth switching means, said second limit switch again trip operable by said tooth rest during indexing of said cutter to effect simultaneous deenergization of said fourth switching means and energization of said third switching means, and a stopping switch actuable to deenergize said switching means to remove said power from said prime movers.

12. In a cutter grinder having a table, a grinding wheel, a base for supporting said table and grinding wheel in opposed relation, and means on the table including a headstock to support and rotate toothed cutter work, the combination of a reversible electric traverse motor operatively connected for reciprocating said table transversely of said grinding wheel, a source of electric power, a first power operable switching means for connecting said traverse motor to said power source to effect forward feeding of said table, a second power operable switching means for reversely connecting said traverse motor to said power source to effect return of said table, a horizontally pivotable tooth rest means mounted on said table and actuated by said cutter work, a reversible electric torque motor operatively connected to said headstock to rotate said cutter in one direction to effect and maintain engagement of a tooth of said cutter with said tooth rest during traversing of said table, a third power operable switching means to connect said torque motor to said power source to cause rotation thereof in said one direction, a fourth power operable switching means to reversibly connect said torque motor to said power source to effect reversal thereof to index said cutter work, an electrical control circuit connected to said switching means for cyclic energization thereof including: a starting switch actuable to effect energization of said first and third switching means, a first limit switch trip operable during feeding of said table to effect simultaneous deenergization of said first and third switching means and energization of said second and fourth switching means, a second limit switch trip operable by said tooth rest during indexing of said cutter to effect simultaneous deenergization of said fourth switching means and energization of said third switching means, a third limit switch trip operable during return of said table to effect deenergization of said second and third switching means and energization of said first and fourth switching means, said second limit switch again trip operable by said tooth rest during indexing of said cutter to effect simultaneous deenergization of said fourth switching means and energization of said third switching means, and a stopping switch actuable to deenergize said switching means to remove said power from said traverse and torque motors.

13. In a cutter grinder having a table, a grinding wheel, a base for supporting said table and grinding wheel in opposed relation, and means on the table including a headstock to support and rotate a toothed cutter work, the combination of a first prime mover for reciprocating said table transversely of said grinding wheel, a source of power, a first power operable switching means for connecting said first prime mover to said power source to effect forward feeding of said table, a second power operable switching means for reversely connecting said first prime mover to said power source to effect return of said table, a fixed tooth rest mounted on said base for supporting a cutter tooth during the grinding operation, a horizontally pivotable auxiliary tooth rest means mounted on said base relative to said fixed tooth rest for engagement with said cutter tooth upon completion of said grinding operation and actuated by said cutter during indexing thereof, a second prime mover operatively connected to said headstock to rotate said cutter in one direction to effect and maintain engagement of a tooth of said cutter with said fixed tooth rest during feeding of said table, a third power operable switching means to connect said second prime mover to said power source to cause rotation thereof in said one direction, a fourth power operable switching means to reversibly connect said second prime mover to said power source to effect reversal thereof to index said cutter work, and an electrical control circuit connected to said switching means for cyclic energization thereof including: a starting switch actuable to effect energization of said first and third switching means, a limit switch trip operable during feeding of said table to effect simultaneous deenergization of said first switching means and energization of said second switching means, a limit switch trip operable during return of said table to effect simultaneous deenergization of said second and third switching means and energization of said first and fourth switching means, a limit switch trip operable by said auxiliary tooth rest during indexing of said cutter to effect simultaneous deenergization of said fourth switching means and energization of said third switching means, and a stopping switch actuable to deenergize said switching means to remove said power source from said first prime mover.

14. In a cutter grinder having a table, a grinding wheel, a base for supporting said table and grinding wheel in opposed relation, and means on the table including a headstock to support and rotate a toothed cutter work, the combination of a reversible electric traverse motor operatively connected for reciprocating said table traversely of said grinding wheel, a source of electric power, a first power operable switching means for connecting said traverse motor to said power source to effect forward feeding of said table, a second power operable switching means for reversely connecting said traverse motor to said power source to effect return of said table, a fixed tooth rest mounted on said base for supporting a cutter tooth during the grinding operation, a horizontally pivotable auxiliary tooth rest means mounted on said base relative to said fixed tooth rest for engagement with said cutter tooth upon completion of said grinding operation and actuated by said cutter during indexing thereof, a reversible electric torque motor operatively connected to said headstock to rotate said cutter in one direction to effect and maintain engagement of a tooth of said cutter with said fixed tooth rest during traversing of said table, a third power operable switching means to connect said torque motor to said power source to cause rotation thereof in said one direction, a fourth power operable switching means to reversibly connect said torque motor to said power source to effect reversal thereof to index said cutter work, and an electrical control circuit connected to said switching means for cyclic energization thereof including: a starting switch actuable to effect energization of said first and third switching means, a limit switch trip operable during feeding of said table to effect simultaneous deenergization of said first switching means and energization of said second switching means, a limit switch trip operable during return of said table to effect simultaneous deenergization of said second and third switching means and energization of said first and fourth switching means, a limit switch trip operable by said auxiliary tooth rest during indexing of said cutter to effect simultaneous deenergization of said fourth switching means and energization of said third switching means and a stopping switch actuable to deenergize said switching means to remove said power from traverse and torque motors.

15. In a cutter grinder having a table, a grinding wheel, a base for supporting said table and grinding wheel in opposed relation and means on the table including a headstock to support and rotate a toothed cutter work, the combination of a first prime mover for reciprocating said table traversely of said grinding wheel, a source of power, a first power operable switching means for connecting said first prime mover to said power source to effect forward feeding of said table, a second power operable switching means for reversely connecting said first prime mover to said power source to effect return of said table, a fixed tooth rest mounted on said base for supporting a cutter tooth during the grinding operation, a horizontally pivotable auxiliary tooth rest means mounted on said base relative to said fixed tooth rest for engagement with said cutter tooth upon completion of said grinding operation and actuated by said cutter during indexing thereof, a second prime mover operatively connected to said headstock to rotate said cutter in one direction to effect and maintain engagement of a tooth of said cutter with said fixed tooth rest during traversing of said table, a third power operable switching means to connect said second prime mover to said power source to cause rotation thereof in said one direction, a fourth power operable switching means to reversibly connect said second prime mover to said power source to effect reversal thereof to index said cutter work and an electrical control circuit connected to said switching means for cyclic energization thereof including: a starting switch actuable to effect energization of said first and third switching means, a first limit switch trip operable during feeding of said table to effect simultaneous deenergization of said first and third switching means and energization of said second and fourth switching means, a second limit switch trip operable by said auxiliary tooth rest during indexing of said cutter to effect simultaneous deenergization of said fourth switching means and energization of said third switching means, a third limit switch trip operable during return of said table to effect simultaneous deenergization of said second and third switching means and energization of said first and fourth switching means, said second limit switch again trip operable by said auxiliary tooth rest during indexing of said cutter to effect simultaneous deenergization of said fourth switching means and energization of said third switching means, and a stopping switch actuable to deenergize said switching means to remove said power from said prime movers.

16. In a cutter grinder having a table, a grinding wheel, a base for supporting said table and grinding wheel in opposed relation, and means on the table including a headstock to support and rotate toothed cutter work, the combination of a reversible electric traverse motor operatively conneced for reciprocating said table transversely of said grinding wheel, a source of elecric power, a first power operable switching means for connecting said traverse motor to said power source to effect forward feeding of said table, a second power operable switching means for reversely connecting said traverse motor to said power source to effect return of said table, a fixed tooth rest means mounted on said base for supporting a cutter tooth during a grinding operation, a horizontally pivotable auxiliary tooth rest means mounted in said base relative to said fixed tooth rest for engagement with said cutter tooth upon completion of said grinding operation and actuated by said cutter during indexing thereof, a reversible electric torque motor operatively connected to said headstock to rotate said cutter in one direction to effect and maintain engagement of a tooth of said cutter with said fixed tooth rest during traversing of said table, a third power operable switching means to connect said torque motor to said power source to cause rotation thereof in said one direction, a fourth power operable switching means to reversibly connect said torque motor to said power source to effect reversal thereof to index said cutter work, an electrical control circuit connected to said switching means for cyclic energization thereof including: a starting switch actuable to effect energization of said first and third switching means, a first limit switch trip operable during feeding of said table to effect simultaneous deenergization of said first and third switching means, a second limit switch trip operable by said auxiliary tooth rest during indexing of said cutter to effect simultaneous deenergization of said fourth switching means and energization of said third switching means, a third limit switch trip operable during return of said table to effect deenergization of said second and third switching means and energization of said first and fourth switching means, said second limit switch again trip operable by said auxiliary tooth rest during indexing of said cutter to effect simultaneous deenergization of said fourth switching means and energization of said third switching means, and a stopping switch actuable to deenergize said switching means to remove said power from said traverse and torque motors.

17. In a cutter grinder having a table, a grinding wheel, a base for supporting said table and grinding wheel in opposed relation and means on the table including a headstock to support and rotate a toothed cutter work, the combination of a first prime mover for reciprocating said table transversely of said grinding wheel, a source of power, a first power operable switching means for connecting said first prime mover to said power source to effect forward feeding of said table, a second power operable switching means for reversely connecting said first prime mover to said power source to effect return of said table, a fixed tooth rest means mounted on said base, for supporting a cutter tooth during each grinding operation, a second prime mover operatively connected to said headstock to rotate said cutter in one direction to effect and maintain engagement of a tooth of said cutter with said fixed tooth rest during traversing of said table, a third power operable switching means to connect said second prime mover to said power source to cause rotation thereof in said one direction, a fourth power operable switching means to reversibly connect said second prime mover to said power source to effect reversal thereof to index said cutter work, and an electrical control circuit connected to said switching means for cyclic energization thereof including: a starting switch actuable to effect energization of said first and third switching means to effect a first cycle of grinding operation on said cutter tooth, a first limit switch trip operable during feeding of said table to effect simultaneous deenergization of said first switching means and energization of said second switching means to effect a second cycle of grinding operation on said cutter tooth, a second limit switch operable during return of said table to effect simultaneous deenergization of said second switching means and energization of said first switching means, power operable counting means sequentially actuable by said first and second limit switches a predetermined number of times to effect deenergization thereafter of said third switching means and energization of said fourth switching means, a third limit switch trip operable by said auxiliary tooth rest during indexing of said cutter to deenergize said fourth switching means and energization of said third switching means, and a stopping switch actuable to deenergize said switching means to remove said power source from said prime movers.

18. In a cutter grinder having a table, a grinding wheel, a base for supporting said table and grinding wheel in opposed relation, and means on the table including a headstock to support and rotate a toothed cutter work, the combination of a reversible electric traverse motor operatively connected for reciprocating said table transversely of said grinding wheel, a source of electric power, a first power operable switching means for connecting said traverse motor to said power source to effect forward feeding of said table, a second power operable switching means for reversely connecting said traverse motor to said power source to effect return of said table, a fixed tooth rest means mounted on said base for supporting a cutter tooth during each grinding operation, a horizontally pivotable auxiliary tooth rest means mounted on said base relative to said fixed tooth rest for engagement with said cutter upon completion of said grinding operation and actuated by said cutter during indexing thereof, a reversible electric torque motor operatively connected to said headstock to rotate said cutter in one direction to effect and maintain engagement of a tooth of said cutter with said fixed tooth rest during traversing of said table, a third power operable switching means to connect said torque motor to said power source to cause rotation thereof in said one direction, a fourth power operable switching means to reversely connect said torque motor to said power source to effect reversal thereof to index said cutter work, and an electrical control circuit connected to said switching means for cyclic energization thereof including: a starting switch actuable to effect energization of said first and third switching means to effect a first cycle of grinding operation on said cutter tooth, a first limit switch trip operable during feeding of said table to effect simultaneous deenergization of said first switching means and energization of said second switching means to effect a second cycle of grinding operation on said cutter tooth, a second limit switch trip operable during return of said table to effect simultaneous deenergization of said second switching means and energization of said first switching means, power operable counting means sequentially actuable by said first and second limit switches a predetermined number of times to thereafter effect deenergization of said third switching means and energization of said fourth switching means, a third limit switch trip operable by said auxiliary tooth rest during indexing of said cutter to deenergize said fourth switching means and energization of said third switching means and a stopping switch actuable to deenergize said switching means to remove said power from said traverse and torque motors.

19. In a cutter grinder having a table, a grinding wheel, a base for supporting said table and grinding wheel is opposed relation and means on the table including a headstock to support and rotate a toothed cutter work, the combination of a first prime mover for reciprocating said table transversely of said grinding wheel, a source of power, a first power operable switching means for connecting said first prime mover to said power source to effect forward feeding of said table, a second power operable switching means for reversely connecting said first prime mover to said power source to effect return of said table, a fixed tooth rest means mounted on said base for supporting a cutter tooth during a grinding operation, a horizontally pivotable auxiliary tooth rest means mounted on said base relative to said fixed tooth rest for engagement with said cutter tooth upon completion of said grinding operating and actuated by said cutter during indexing thereof, a second prime mover operatively connected to said headstock to rotate said cutter in one direction to effect and maintain engagement of a tooth of said cutter with said fixed tooth rest during traversing of said table, a third power operable switching means to connect said second prime mover to said power source to cause rotation thereof in said one direction, a fourth power operable switching means to reversibly connect said second prime mover to said power source to effect reversal thereof to index said cutter work, a plurality of resistors, a fifth power operable switching means to insert said resistances in series with said power source and said second prime mover to effect reduction of the output torque thereof, and an electrical control circuit connected to said switching means for cyclic energization thereof including: a starting switch actuable to effect energization of said first and third switching means, a first limit switch trip operable during feeding of said table to effect simultaneous deenergization of said first and third switching means and energization of said second, fourth, and fifth switching means, a second limit switch trip operable by said auxiliary tooth rest during indexing of said cutter to effect simultaneous deenergization of said fourth switching means and energization of said third switching means, a third limit switch trip operable during return of said table to effect simultaneous deenergization of said second, third and fifth switching means and energization of said first and fourth switching means, and a stopping switch actuable to deenergize said switching means to remove said power from said prime movers.

20. In a cutter grinder having a table, a grinding wheel, a base for supporting said table and grinding wheel in opposed relation, and means on the table including a headstock to support and rotate toothed cutter work, the combination of a reversible electric traverse motor operatively connected for reciprocating said table transversely of said grinding wheel, a source of electric power, a first power operable switching means for connecting said traverse motor to said power source to effect forward feeding of said table, a second power operable switching means for reversely connecting said traverse motor to said power source to effect return of said table, a fixed tooth rest mounted on said base for supporting a cutter tooth during a grinding operation, a horizontally pivotable auxiliary tooth rest means mounted on said base relative to said fixed tooth rest for engagement with said cutter tooth upon completion of said grinding operation and actuated by said cutter during indexing thereof, a reversible electric torque motor operatively connected to said headstock to rotate said cutter in one direction to effect and maintain engagement of a tooth of said cutter with said fixed tooth rest during traversing of said table, a third power operable switching means to connect said torque motor to said power source to cause rotation thereof in said one direction, a fourth power operable switching means to reversibly connect said torque motor to said power source to effect reversal thereof to index said cutter work, a plurality of resistors, a fifth power operable switching means to insert said resistances in series with said power source and said torque motor to effect reduction of the output torque thereof, and an electrical control circuit connected to said switching means for cyclic energization thereof including: a starting switch actuable to effect energization of said first and third switching means, a first limit switch trip operable during feeding of said table to effect simultaneous deenergization of said first and third switching means and energization of said second, fourth, and fifth switching means, a second limit switch trip operable by said auxiliary tooth rest during indexing of said cutter to effect simultaneous deenergization of said fourth switching means and energization of said third switching means, a third limit switch trip operable during return of said table to effect simultaneous deenergization of said second, third and fifth switching means and energization of said first and fourth switching means, and a stopping switch actuable to deenergize said switching means to remove said power from said traverse and torque motors.

21. A cutter grinder for successive automatic grinding of a series of teeth on a cutter or workpiece comprising a base, a grinding wheel and a work support mounted on the base for relative traversing movement, means for effecting said traverse, a tooth rest carried by the base adjacent the grinding wheel for positioning a workpiece tooth during grinding, a flipper tooth rest supported in position to engage a workpiece tooth to restrain rotary movement of the workpiece in one direction and movable by rotary indexing movement of the workpiece in the opposite direction, a reversible torque motor carried by the work support for effecting opposite directions of rotary movement of a supported workpiece and maintaining a torque thereon during a grinding operation, a first means to reverse said torque motor to index a workpiece whereby the workpiece will react on and move the flipper tooth, and control means for said torque motor operable by movement of said flipper tooth to reverse the torque motor to urge the tooth of the indexed workpiece against the tooth rests.

22. A cutter grinder comprising a base, a grinding wheel carried by the base, a tooth rest carried by the base adjacent the grinding wheel for positioning a workpiece tooth during grinding, a work support reciprocably mounted on the base for supporting workpiece during grinding, a variable torque motor on the work support effective yieldingly to urge a supported workpiece into engagement with the tooth rest, means for reversing the direction of reciprocation of said support, and control means automatically actuable by support reversal to vary the torque of said motor.

23. A cutter grinder for successive automatic grinding of a series of teeth on a cutter or workpiece comprising a base, a grinding wheel and a work support mounted on the base for relative traversing movement, power means for effecting said traverse, a tooth rest carried by the base adjacent the grinding wheel for positioning a workpiece tooth during grinding, a flipper tooth rest supported in position to engage a workpiece tooth to restrain rotary movement of the workpiece in one direction and movable by rotary indexing movement of the workpiece in the opposite direction, a reversible torque motor carried by the work support for effecting opposite directions of rotary movement of a supported workpiece and maintaining a torque thereon during a grinding operation, a first means to reverse said torque motor to index a workpiece whereby the workpiece will react on and move the flipper tooth, and control means for said power traverse effecting means operable by movement of said flipper tooth to reverse said power means and thus the relative traversing movement of the wheel and work support.

24. A cutter grinder comprising a base, a grinding wheel and a work support mounted on the base for relative traversing movement, power means for effecting said traverse, automatic reversing means for said power means, a tooth rest carried by the base adjacent the grinding wheel for positioning a workpiece tooth during grinding, a flipper tooth rest supported in position to engage a workpiece tooth to restrain rotary movement of the workpiece in one direction and movable by rotary indexing movement of the workpiece in the opposite direction, a reversible torque motor carried by the work support for effecting opposite directions of movement of a supported workpiece, a stroke counting device actuable by the automatic reversing means, a reverser for the torque motor controlled by said device, reversal of said torque motor operating to index a workpiece whereby the workpiece will react on and move the flipper tooth, and control means for said power traverse effecting means operable by movement of said flipper tooth to initiate the relative traversing movement of the wheel and work support in a reverse direction.

25. A cutter grinder comprising a base, a grinding wheel carried by the base, a tooth rest carried by the base adjacent the grinding wheel for positioning a workpiece tooth during grinding, a work support reciprocably mounted on the base for supporting workpiece during grinding, a variable torque motor on the work support effective yieldingly to urge a supported workpiece into engagement with the tooth rest, power means for reciprocating said work support, means for automatically reversing said power means and the direction of reciprocation of said support, and control means automatically actuable by the support reversing means to vary the torque of said motor.

26. A cutter grinder comprising a base, a grinding wheel carried by the base, a tooth rest carried by the base adjacent the grinding wheel for positioning a workpiece tooth during grinding, a work support reciprocably mounted on the base for supporting workpiece during grinding, a variable torque motor on the work support effective yieldingly to urge a supported workpiece into engagement with the tooth rest, power means for reciprocating said work support, means for automatically reversing said power means and the direction of reciprocation of said support, control means automatically actuable by the support reversing means to vary the torque of said motor, additional means actuable by said reversing means to reverse the torque motor to index a supported workpiece, a flipper tooth rest supported in position to engage a workpiece tooth to restrain rotary movement of the workpiece in one direction and movable by rotary indexing movement of the workpiece in the opposite direction, and control means for said power means actuable by said movement of the flipper tooth rest to initiate reverse direction power reciprocation of the work support.

27. A cutter grinder for successive automatic grinding of a series of teeth on a cutter or workpiece comprising a base, a grinding wheel and a work support mounted on the base for relative traversing movement, power means for effecting said traverse, a tooth rest carried by the base adjacent the grinding wheel for positioning a workpiece tooth during grinding, a flipper tooth rest supported in position to engage a workpiece tooth to restrain rotary movement of the workpiece in one direction and movable by rotary indexing movement of the workpiece in the opposite direction, a reversible torque motor carried by the work support for effecting opposite directions of rotary movement of a supported workpiece and maintaining a torque thereon during a grinding operation, a first means to reverse said torque motor to index a workpiece whereby the workpiece will react on and move the flipper tooth, and control means for said power traverse effecting means operable by movement of said flipper tooth to reverse said power means and thus the relative traversing movement of the wheel and work support, said control means including an automatic limit switch movable in one direction by said flipper tooth and oppositely movable when released by the flipper tooth, and a control circuit completable by said opposite movement for reversing the torque motor, said means for initiating operation of the traverse power means, including a flipper tooth actuated timer switch.

References Cited in the file of this patent

UNITED STATES PATENTS

| | | |
|---|---|---|
| 1,875,163 | Scharff | Aug. 30, 1932 |
| 1,973,329 | Bullows | Sept. 11, 1934 |
| 1,975,947 | Isler et al. | Oct. 9, 1934 |